April 29, 1941.          F. J. PAUL                2,240,443
                          WASHER
          Filed Feb. 8, 1939          2 Sheets-Sheet 1
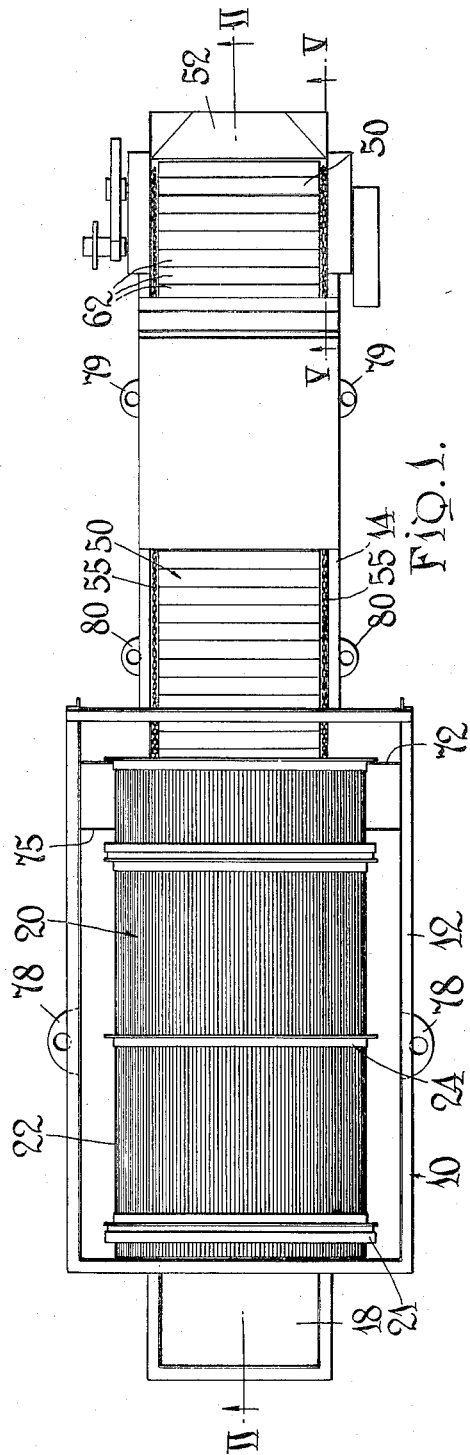
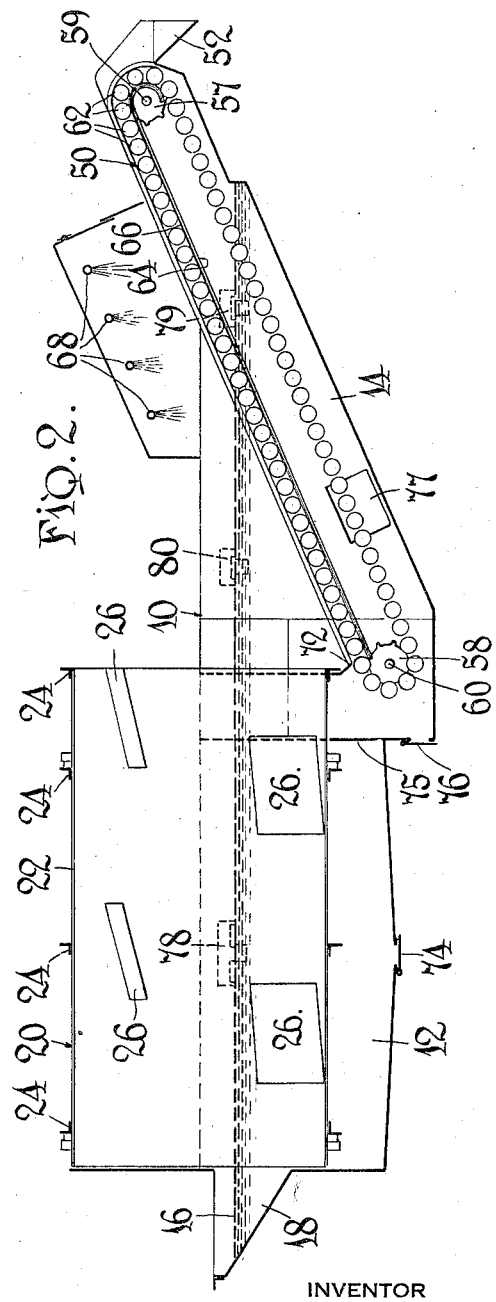
INVENTOR
FREDERICK J. PAUL
BY
Beau, Brooks, Buckley & Beau
ATTORNEYS April 29, 1941.  F. J. PAUL  2,240,443
WASHER
Filed Feb. 8, 1939  2 Sheets-Sheet 2
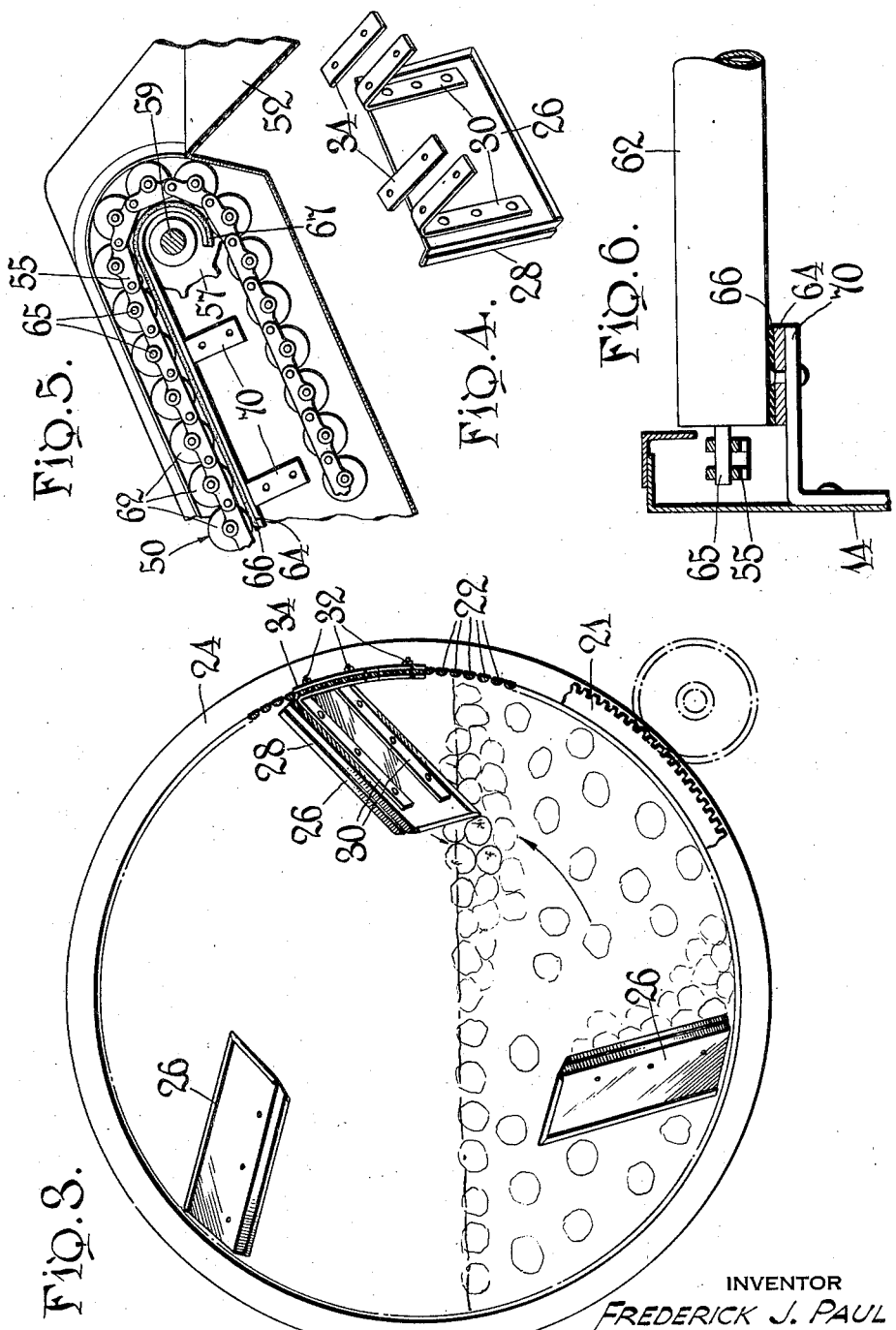
INVENTOR
FREDERICK J. PAUL
BY
Beau, Brooks, Buckley & Beau
ATTORNEYS Patented Apr. 29, 1941

2,240,443

UNITED STATES PATENT OFFICE 2,240,443

WASHER

Frederick J. Paul, Fredonia, N. Y., assignor to Huntley Manufacturing Co., Brocton, N. Y.

Application February 8, 1939, Serial No. 255,290

4 Claims. (Cl. 146—197)

This invention relates to apparatus for treatment of fruits or vegetable commodities preparatory to commercial distribution, canning operations, or the like; and one of the objects of the invention is the provision of an improved device which is particularly suitable for use in connection with the cleaning and inspection of whole tomatoes prior to delivery to pulping, peeling, trimming, sorting, or other treating equipment.

Tomatoes from the field are invariably associated with a certain amount of surface dirt, trash, and other refuse materials as well as with a certain amount of decayed or moldy portions, all of which must preferably be removed prior to delivery to final food preparing equipment; and it is another object of the present invention to provide an improved and simplified apparatus for cleansing such fruits and vegetables and segregating refuse and decayed portions therefrom. Other objects and advantages of the invention will appear from the specification herein which, it will be understood, is merely exemplary thereof.

In the drawings:

Fig. 1 is a plan of an apparatus of the invention;

Fig. 2 is a longitudinal section taken substantially along line II—II of Fig. 1;

Fig. 3 is an end view, on an enlarged scale, of an agitating element of the apparatus with portions broken away showing certain construction features of the device;

Fig. 4 is a perspective of one of the agitation devices of the apparatus shown as being detached from its mounting;

Fig. 5 is a fragmentary vertical section, on an enlarged scale taken substantially along line V—V of Fig. 1; and Fig. 6 is a fragmentary section, on an enlarged scale, taken substantially along line VI—VI of Fig. 5.

The apparatus comprises generally a wash tank for containing a supply of water or other cleansing liquid; a revolving drum equipped with agitator blades and partially submerged in the liquid bath and adapted to be revolved and to agitate the tomatoes or other fruits or vegetables and to roll them one against another and to contemporaneously convey them slowly from the feed end of the tank toward an inclined elevator device which is adapted to continuously roll the fruits or vegetables and elevate them to a point of discharge above the level of the liquid bath. Means for rinsing the treated commodity with fresh water or other solution just prior to its discharge from the elevating conveyor are also provided. Special arrangements for segregating refuse materials from the product during the tumbling and elevating operations are provided, and one of the features of the apparatus involves the provision of an improved means for continuously segregating and removing such waste materials from the liquid bath.

As illustrated in the drawings, the wash tank 10 is provided generally in open top box form, and more specifically, comprises a front end section 12 of enlarged plan form and substantially of flat bottom and a rear end section 14 of reduced plan form and provided with a bottom plate that slopes upwardly toward the terminal end thereof. The tank 10 is adapted to contain a supply of water or other liquid solution therein at approximately the level line indicated at 16; and a receiving hopper 18 is built into the front end wall of the section in such manner as to provide a receiving opening adjacent the line of the water level and within convenient access of persons dumping baskets of fruit or vegetables into the apparatus. An agitator 20 in the form of an open end cylinder is mounted in horizontal axial attitude upon the tank structure and in partially submerged relation in the liquid bath and is provided with a ring gear 21 through which the agitator is arranged to be revolved about its longitudinal axis by a suitable source of power (not shown). The agitator 20 is formed of a series of longitudinally arranged rod elements 22 which are suitably mounted upon girth rings 24 in slightly spaced relation (Fig. 3). Thus, the rod elements 22 substantially comprise the peripheral structure of the agitator.

A plurality of scoops 26 of generally flat plate form are mounted in the interior of the agitator by means of angle straps 30 which are riveted or bolted thereto. As illustrated in Figs. 3 and 4, the scoops 26 are preferably formed at their forward ends with upturned flange portions 28, and are mounted upon the agitator wall by means of bolts 32 extending through the angle straps 30 and through suitable openings between the rods 22 and into connected relation with outer locking plates 34 (Figs. 3 and 4). The connections between the angle straps 30 and the agitator wall are so made as to dispose the flat body portion of the scoops 26 transversely at slight angles to radial lines drawn from the axis of rotation toward the scoops, and also longitudinally at angles to the axis of rotation (Fig. 3). Consequently, as the agitator revolves, the scoops will move into gathering and lifting relation with respect to the fruits or vegetables immersed within the tank bath and the product will thus be lifted thereby through the body of the tank liquid to positions approximating the upper liquid level at which time the angular relationship of the scoops to their corresponding radial lines will cause the products to roll inwardly toward the center of the agitator and off the scoops. Contemporaneously with the above described radially directed rolling action, the angular disposition of the scoops relative to the axis of agitator rotation will cause the fruits or vegetables to be urged longitudinally of the agitator. Thus, the product is moved in a zig zag path through the agitator with gently rolling movement from scoop to scoop.

As shown in Fig. 3, the scoops 26 are arranged in groups of 3, the members of each group being radially disposed in spaced relation about the inner periphery of the agitator; said groups of scoops being arranged in continuous relation longitudinally of the agitator. Thus, whenever fruits or vegetables are dumped into the receiving hopper 18 they move into the open inlet end of the agitator in either floating or semi-floating fashion, and as the agitator revolves the scoops 26 successively gather portions of the product in the lower region of the tank bath and lift them upwardly toward the top level of the liquid bath and contemporaneously impart rolling movements thereto in both radial and longitudinal directions. Thus, the fruits or vegetables are alternately rolled outwardly toward the periphery of the agitator and then inwardly toward the center thereof while at the same time they are given continuous rolling movement in a general direction toward the outlet end of the agitator. Thus a greatly improved dirt and refuse removing treatment is given to the product, while at the same time the product is handled in an extremely gentle and improved manner from the standpoint of avoidance of bruising or other damage-producing handling.

As a further aid to the provision of safe and gentle treatment of the fruits or vegetables during this agitation process, the rods 22 of the agitator perimeter are preferably formed with rounded inner surfaces (Fig. 3). Thus, as the product is gathered by the scoops in the lower region of the liquid bath and rolled outwardly thereon toward the agitator periphery, the product comes into contact with no sharp edged structures such as would otherwise cut or bruise the surfaces of the product. As the dirt or other refuse becomes softened and works loose from the product it sifts downwardly through the spaces between the rods 22 and toward the bottom of the tank.

Because of the particular arrangement of scoop attitude relative to corresponding radial lines extending from the axis of rotation as hereinabove described, the discharge rolling movement of the product from the scoops 26 toward the center of the agitator commences prior to the time that the scoops gain any appreciable altitude above the top level of the liquid bath. Consequently, the fruits or vegetables are rolled off the scoops in the region of the top level of the liquid bath and in such fashion that they gain no substantial velocity of movement prior to meeting support again by the liquid bath. Thus, there will be no destructive impingement between the discharging streams of fruits or vegetables and other portions of the product that are floating in the bath, such as would otherwise occur if the scoops 26 were arranged in true radially extending relation.

The second section 14 of the liquid tank accommodates the lower end of a continuous type inclined conveyor or elevator 50, the lower end of which is adapted to receive a continuous stream of fruits or vegetables from the outlet end of the agitator 20. The upper end of the elevator 50 is above the top level of the liquid bath and is arranged to discharge the fruit or vegetable products upon an apron 52 leading to any further desired treatment apparatus or packaging means, or the like. The conveyor 50 is shown as comprising a pair of opposed endless chains 55, each of which are mounted upon corresponding opposed head and foot sprockets 57 and 58, respectively; the head and foot sprockets being carried by corresponding shafts 59 and 60 respectively. The shafts are mounted in suitable bearings and power transmission means are operatively associated with the head shaft 59 for rotation of the latter (not shown).

The chains 55 may be of any desired form, as for example number 455 standard pintle type, and each alternate link carries an extending bracket portion such as in the case of the standard MI type attachment; the extending bracket portion being formed with a circular opening therethrough at a position offset from the line of the link pin axes. A series of rollers 62 provided at each of their ends with reduced extending pins 65 (Fig. 6) are arranged between the pair of opposed chains 55, the pins 65 of the rollers being rotatably mounted within the offset openings of the bracket portions of the alternate links. The body portions of the rollers 62 are of straight cylindrical form and are of such diameters as to provide in each case a small gap between opposed surface portions of adjacent rollers. Hence, the possibility of friction between the rollers is eliminated, and provision is made to allow for drainage of the liquid bath solution from the fruits or vegetables during the latter part of their conveyance toward the discharge apron 52 while they are being supported by the conveyor above the top level of the liquid bath.

A pair of opposed tracks 64 in the form of strip metal are provided adjacent the under portions of the opposite ends of the rollers 62 of the upper flight of conveyor, and are mounted upon the tank structure in such manner as to provide bearing surfaces for rolling supporting contact by the ends of the roller 62 as the chains 55 revolve upon the sprockets. Preferably, the tracks 64 are provided at their upper surface portions with friction type liner strips 66. The strips 66 may be formed, for example, of brake lining type material, and are provided to insure that the rollers 62 rotate in positive manner as they move upwardly from the feed end toward the discharge end of the conveyor. Consequently, as the tomatoes or other fruits or vegetables are carried by the conveyor from the region of the agitator discharge toward the discharge apron 52, they are given continuous rotary motions by reason of their direct contact with the revolving rollers. Also, it will be understood that the tomatoes or other commodities will naturally gravitate into the V-shaped spaces between adjacent roller members during the elevating process; and thus an elevator is provided of such form that product receiving pockets are provided in an improved manner and in such fashion that no sharp edged portions come in contact with the product.

As the rollers move adjacent the head sprockets 57 and around the discharge end of the conveyor, the weights of the individual product particles are shifted from against the rollers succeeding them to the rollers next preceding them. Inasmuch as the roller next preceding each fruit particle is rotating in such manner that the surface thereof that is contiguous with said fruit particle is moving upwardly and forwardly in the general direction of conveyor travel, it will be understood that the shifting of weight causes the product particles to be urged upwardly and outwardly of the spaces between adjacent rollers as they move over and around the line of the head sprockets. Consequently, the possibility of pinching product particles between the rollers in this region of conveyor flexure is eliminated.

The upper end portions of the opposed tracks 64 are supported upon the frame structure as by means of the brackets 70 and are arranged to extend upwardly therebeyond in cantilever relation adjacent the head shaft 59. The end portions of the tracks 64 are bent substantially concentrically of the shaft as at 67 (Fig. 5) to guide the rollers 62 around the rotational axis of the shaft 59. The curved end portions 67 are preferably formed of resilient material such as structural steel strip or the like, and previous to assembly in the apparatus the end portions are given permanent curvatures about a radius that is substantially greater than the apparent radius of the curve as viewed in Fig. 5. Thus, when the chain and roller assembly is installed and connected for operation as shown, the track end portions 67 are elastically deformed into the shape illustrated and therefore resiliently urge the rollers 62 outwardly toward paths around the shaft 59 at increasingly greater radius lengths. Consequently, wearing of the chain connection parts is automatically compensated for, and the chain and roller assembly is always maintained in normally taut condition, whereby positive traction between the rollers 62 and the tracks 64 is assured.

A series of fresh water spray nozzles 68 (Fig. 2) are arranged to direct sprays of fresh rinse water downwardly against the product as it emerges from the liquid bath and is conveyed upwardly therefrom toward the discharge end of the elevator. Inasmuch as the fruit or vegetable particles are continuously being revolved during the elevating action, the rinse sprays have ample opportunity to scrub and wash all remaining dirt or refuse which might be clinging to the product surfaces, and the spaces between the rollers allow prompt and effective drainage of the rinsing liquid from the product prior to its being delivered to the discharge apron.

As illustrated in Fig. 2, the lower end of the elevator 50 is disposed beneath the discharge lip portion of the agitator 20, and an apron 72 is arranged about the lower portion of the agitator lip and in inclined relation to the elevator and in such manner as to prevent escape of fruits or vegetables from the discharge end of the agitator into the space between the tank walls and the agitator, and to positively direct the movement of the product toward the elevator 50.

As explained hereinabove, the major portion of the mud or other dirt that reduces to relatively fine form when becoming wetted, filters through the spaces between the rods 22 of the agitator 20 and accumulates in the bottom portion of the main section 12 of the liquid tank. A cleanout port and quick opening closure therefor is provided as at 74 whereby the heavy refuse may be removed from the tank as it accumulates; the closure element being in the form of a quick-opening gate valve, or any other desired device. A partition 75 extending from the bottom of the tank section 12 and between opposite side walls thereof is disposed adjacent the discharge end of the agitator 20 to prevent the transportation of sediment accumulations from the bottom of the tank section 12 into the region of the elevator 50. Thus, possible secondary soiling of the product in the region of the elevator foot is eliminated. A second cleanout valve 76 is arranged in a wall portion of the fluid tank adjacent the lower end of the elevator for periodic removal of sediments accumulating in the region thereof. Also, a cleanout door 77 is provided in a side wall portion of the fluid tank structure adjacent an intermediate portion of the elevator 50, whereby any accumulated refuse may be conveniently removed therefrom.

To provide for removal of floating refuse from the liquid bath a series of overflow outlets are provided adjacent the top level of the liquid bath at strategic points about the side walls of the liquid tank. As illustrated in Figs. 1 and 2, a pair of such overflow outlets 78 are provided in opposed relation adjacent the approximate center of the agitator 20, and are thus adapted to carry away the majority of the floating refuse coming to the surface in the region of the agitator; it being understood that a continuous inflow of fresh liquid is supplied to the tank whereby a continuous overflow to suitably arranged waste conduits will be effected. A second pair of overflow outlets 79 are provided in opposed relation in the region adjacent the elevator and below the field of the sprays 68, and are thus adapted to carry away floating refuse such as may be liberated from the product by the action of the sprays. A third pair of overflow outlets 80 are provided in opposed relation at the tank walls approximately in the region of maximum depth of the tank section 14 and maximum distance from the agitator 20 and the elevator 50. Thus, the overflow outlets 80 are in regions of comparative quietude; that is, the liquid bath in the regions of the outlets 80 is relatively quiet and unagitated as compared to the condition of other portions of the liquid bath which are closely adjacent moving elements of the apparatus. Consequently, the refuse materials floating into the region of the liquid bath between the outlets 80 are allowed to float quietly upon the top of the liquid bath and to become segregated in a manner that could not be so effectively obtained in an agitated fluid bath region. Thus, an improved system for removing floating and sinking refuse from the product has been provided.

Although only one form of the invention has been shown and described in detail, it will be apparent to those skilled in the art that the invention is not so limited but that various changes may be made therein without departing from the spirit of the invention or from the scope of the appended claims.

I claim:

1. An apparatus for washing agricultural products or the like including a liquid tank adapted to receive agricultural products, an inclined conveyor system comprising a series of product carrying rollers mounted upon an endless chain device, a track for the upper flight of said conveyor system adapted to support the latter and to engage said rollers in tractional relationship, said track being arranged to support some of said rollers when at the lower end of said track within the liquid of said tank and being rigidly supported at its lower and intermediate portions and having an upper end portion extending above the liquid of said tank and in cantilever fashion from said rigidly supported portions and curving downwardly at its extreme end portion to provide a smoothly curved reversal of conveyor movement direction, said track end portion being of resilient material and normally maintained by the dimensional limitations of said chain in elastically deformed condition, whereby said track end portion resiliently maintains said conveyor in taut condition and insures rolling motion of said rollers when travelling along the path of said upper flight track.

2. An apparatus for washing agricultural products including a liquid tank and an open end cylindrical agitator partially submerged in the liquid of said tank and arranged to be revolved about a horizontal axis, said agitator being provided with a series of scoops extending inwardly from the perimeter thereof and inclined relative to said axis of rotation and to corresponding radial lines extended from said axis toward said scoops for rolling movement of the products being washed under said liquid toward a point of discharge from said agitator, and an inclined conveyor having its material receiving end adjacent said point of discharge within said liquid and its upper discharge end above said liquid, said conveyor comprising a series of product carrying rollers mounted upon an endless chain device, a track for the upper flight of said conveyor adapted to support the latter and to engage said rollers in tractional relationship, said track being arranged to support some of said rollers when at the lower end of said track within the liquid of said tanks and being rigidly supported at its lower and intermediate portions and having an upper end portion extending above the liquid of said tank and in cantilever fashion from said rigidly supported portions and curving downwardly at its extreme end portion to provide a smoothly curved reversal of conveyor movement direction, said track end portion being of resilient material and normally maintained by the dimensional limitations of said chain in elastically deformed condition, whereby said track end portion resiliently maintains said conveyor in taut condition and insures rolling motion of said rollers when travelling along the path of said upper flight track.

3. An apparatus for washing agricultural products while constantly rolling the latter, including a liquid containing tank, a cylindrical agitator partially submerged in the liquid of said tank and mounted upon said tank with its longitudinal axis disposed horizontally and provided with opposite inlet and outlet openings at its ends, means for rotating said agitator about its longitudinal axis, a plurality of scoops mounted upon the interior of said agitator and inclined with respect to corresponding radial lines extended from said axis toward said scoops and downwardly toward said outlet opening in the direction of movement of said products through said agitator, an inlet hopper for receiving products to be washed adjacent the inlet opening of said agitator, an inclined conveyor comprising a series of parallel rollers carried by an endless chain device, the lower end of said conveyor being disposed beneath the outlet opening of said agitator and the upper end of said conveyor being disposed above the top level of the liquid of said tank, track means in supporting contact with said rollers and adapted to cause the latter to rotate during their travel from the lower end to the upper end of said conveyor, said track means having an upper end portion curving downwardly and rearwardly to provide reversal of roller movement direction, said curved track portion being of resilient material and normally maintained by the dimensional limitations of said chain device in elastically deformed condition whereby said conveyor is always maintained taut, and conduit means for directing sprays of fresh rinse water upon the product as it is being carried and rotated by the conveyor rollers toward the upper end of said conveyor and above the level of said liquid.

4. An apparatus for washing agricultural products while constantly rolling the latter, including a liquid containing tank, a cylindrical agitator partially submerged in the liquid of said tank and mounted upon said tank with its longitudinal axis disposed horizontally and provided with opposite inlet and outlet openings at its ends, means for rotating said agitator about its longitudinal axis, a plurality of scoops mounted upon the interior of said agitator and inclined with respect to corresponding radial lines extended from said axis toward said scoops and downwardly toward said outlet opening in the direction of movement of said products through said agitator, an inlet hopper for receiving products to be washed adjacent the inlet opening of said agitator, an inclined conveyor comprising a series of parallel rollers carried by an endless chain device, the lower end of said conveyor being disposed beneath the outlet opening of said agitator and the upper end of said conveyor being disposed above the top level of the liquid of said tank, and track means in supporting contact with said rollers and adapted to cause the latter to rotate during their travel from the lower end to the upper end of said conveyor, said track means having an upper end portion curving downwardly and rearwardly to provide reversal of roller movement direction, said curved track portion being of resilient material and normally maintained by the dimensional limitations of said chain device in elastically deformed condition whereby said conveyor is always maintained taut.

FREDERICK J. PAUL.